US010623502B2

United States Patent
McCann et al.

(10) Patent No.: US 10,623,502 B2
(45) Date of Patent: Apr. 14, 2020

(54) LINK INDICATION REFERRING TO CONTENT FOR PRESENTING AT A MOBILE DEVICE

(71) Applicant: BLACKBERRY LIMITED, Waterloo (CA)

(72) Inventors: Stephen McCann, Southampton (GB); Michael Peter Montemurro, Toronto (CA); David Philip Hole, Southampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/794,191

(22) Filed: Jul. 8, 2015

(65) Prior Publication Data
US 2016/0226981 A1    Aug. 4, 2016

Related U.S. Application Data

(60) Provisional application No. 62/112,013, filed on Feb. 4, 2015.

(51) Int. Cl.
| | |
|---|---|
| *H04L 29/08* | (2006.01) |
| *H04W 12/06* | (2009.01) |
| *H04W 4/021* | (2018.01) |
| *H04L 29/06* | (2006.01) |
| *H04W 12/08* | (2009.01) |
| *H04W 12/00* | (2009.01) |

(52) U.S. Cl.
CPC .......... *H04L 67/146* (2013.01); *H04L 63/10* (2013.01); *H04W 4/021* (2013.01); *H04W 12/003* (2019.01); *H04W 12/06* (2013.01); *H04W 12/08* (2013.01); *H04L 63/0876* (2013.01); *H04L 67/02* (2013.01)

(58) Field of Classification Search
CPC .............................. H04L 67/146; H04W 12/06
USPC .............................................................. 726/7
See application file for complete search history.

(56) References Cited

U.S. PATENT DOCUMENTS

| | | | |
|---|---|---|---|
| 6,865,680 B1 * | 3/2005 | Wu ........................ | H04W 12/06 380/270 |
| 9,419,968 B1 * | 8/2016 | Pei .......................... | G06F 21/31 |
| 9,635,604 B2 * | 4/2017 | Chen ...................... | H04W 48/18 |
| 9,697,295 B1 * | 7/2017 | Nijim ................. | G06F 17/30876 |
| 2006/0174127 A1 * | 8/2006 | Kalavade ................ | H04L 63/08 713/176 |

(Continued)

FOREIGN PATENT DOCUMENTS

| | | |
|---|---|---|
| CA | 2817932 | 12/2013 |
| CN | 104168280 A | 11/2014 |

(Continued)

OTHER PUBLICATIONS

WI-FI Alliance, Wi-Fi Certified Passpoint, Hotspot 2.0 (Release 2) Technical Specification, Version 1.0.0, "A Solution for Next Generation Wi-Fi Hotspots"; 2014; 207 pages.

(Continued)

*Primary Examiner* — Shin-Hon (Eric) Chen
*Assistant Examiner* — Dereena T Cattungal
(74) *Attorney, Agent, or Firm* — Trop, Pruner & Hu, P.C.

(57) ABSTRACT

During an automated login process to a wireless network, a mobile device receives, from an access node, a link indication referring to content for presenting at the mobile device.

20 Claims, 12 Drawing Sheets

(56) References Cited

U.S. PATENT DOCUMENTS

| | | | |
|---|---|---|---|
| 2007/0091848 A1* | 4/2007 | Karia | H04L 29/06027 370/331 |
| 2007/0167174 A1* | 7/2007 | Halcrow | H04W 48/16 455/456.2 |
| 2009/0300722 A1* | 12/2009 | Haverinen | H04L 63/08 726/4 |
| 2011/0040867 A1* | 2/2011 | Kalbag | H04W 12/06 709/224 |
| 2011/0078771 A1* | 3/2011 | Griffin | G06F 21/32 726/5 |
| 2012/0210011 A1 | 8/2012 | Liu | |
| 2013/0007850 A1* | 1/2013 | Lambert | H04L 63/126 726/4 |
| 2013/0067599 A1* | 3/2013 | Raje | G06F 8/65 726/29 |
| 2013/0262850 A1* | 10/2013 | Canpolat | H04W 12/08 713/150 |
| 2013/0268666 A1 | 10/2013 | Wilson | |
| 2013/0276076 A1* | 10/2013 | Gupta | H04W 12/06 726/5 |
| 2013/0333016 A1* | 12/2013 | Coughlin | H04W 12/06 726/9 |
| 2014/0123306 A1* | 5/2014 | Jung | H04L 41/5054 726/27 |
| 2014/0143435 A1* | 5/2014 | Jung | H04W 4/18 709/228 |
| 2014/0185597 A1* | 7/2014 | Gupta | H04L 63/0823 370/338 |
| 2015/0067782 A1* | 3/2015 | Choi | H04L 63/102 726/3 |
| 2015/0071268 A1* | 3/2015 | Kennedy | H04W 8/08 370/338 |
| 2015/0143473 A1* | 5/2015 | Jung | H04W 12/06 726/4 |
| 2015/0223158 A1* | 8/2015 | McCann | H04W 48/20 370/254 |
| 2015/0234051 A1* | 8/2015 | Moshfeghi | G01S 19/07 342/357.43 |
| 2015/0264051 A1* | 9/2015 | Hoggan | H04L 63/0892 726/1 |
| 2016/0180345 A1* | 6/2016 | Canpolat | G06Q 30/00 705/26.1 |

FOREIGN PATENT DOCUMENTS

| | | |
|---|---|---|
| CN | 104221414 A | 12/2014 |
| WO | 2008148191 | 12/2008 |
| WO | 2010083522 | 7/2010 |

OTHER PUBLICATIONS

IEEE, Standard for Information Technology—Telecommunications and Information Exchange Between Systems Local and Metropolitan area networks—Specific Requirements; Part 11: "Wireless LAN Medium Access control (MAC) and Physical Layer (PHY) Specifications"; 2012; 2,793 pages.

Wikipedia; "Captive Portal"; https://web.archive.org/web/20150202195543/https://en.wikipedia.org/wiki/Captive_portal; Feb. 2, 2015; 6 pages.

Canadian Intellectual Property Office, International Search Report and Written Opinion for PCT/CA2016/050098 dated May 11, 2016 (9 pages).

European Patent Office, Extended European Search Report for Appl. No. 16746036.9 dated Jul. 13, 2018 (11 pages).

European Patent Office, Communication pursuant to Article 94(3) EPC for Appl. No. 16746036.9 dated Mar. 4, 2019 (6 pages).

European Patent Office, Communication pursuant to Article 94(3) EPC for Appl. No. 16746036.9 dated Feb. 14, 2020 (6 pages).

* cited by examiner

LINK INDICATION REFERRING TO CONTENT FOR PRESENTING AT A MOBILE DEVICE

CROSS-REFERENCE TO RELATED APPLICATION

This application claims the benefit under 35 U.S.C. § 119(e) of U.S. Provisional Application Ser. No. 62/112,013, entitled "NOTIFICATION OF LOCAL CONTENT ON CONNECTION TO WLAN," filed Feb. 4, 2015, which is hereby incorporated by reference.

BACKGROUND

A captive portal is a network service that forces a mobile device to be authorized and authenticated prior to establishing network access. The captive portal is often used to present a login page to the user on the user device. The foregoing is performed by placing a newly connected mobile device in a walled garden once the mobile device establishes a link with the network, and filtering most, if not all, traffic between the mobile device and the remainder of the network, and redirecting a browser of the mobile device to a web page that includes the login page.

The web page to which the browser is redirected can seek authentication and/or a payment scheme (e.g. advice of charge), or can display a use policy (e.g. terms and conditions) that the user is to agree to. Captive portals can be used in a hotel room, in a business center, in an airport, or in another location.

BRIEF DESCRIPTION OF THE DRAWINGS

Some implementations are described with respect to the following figures.

DETAILED DESCRIPTION

Figure 1:
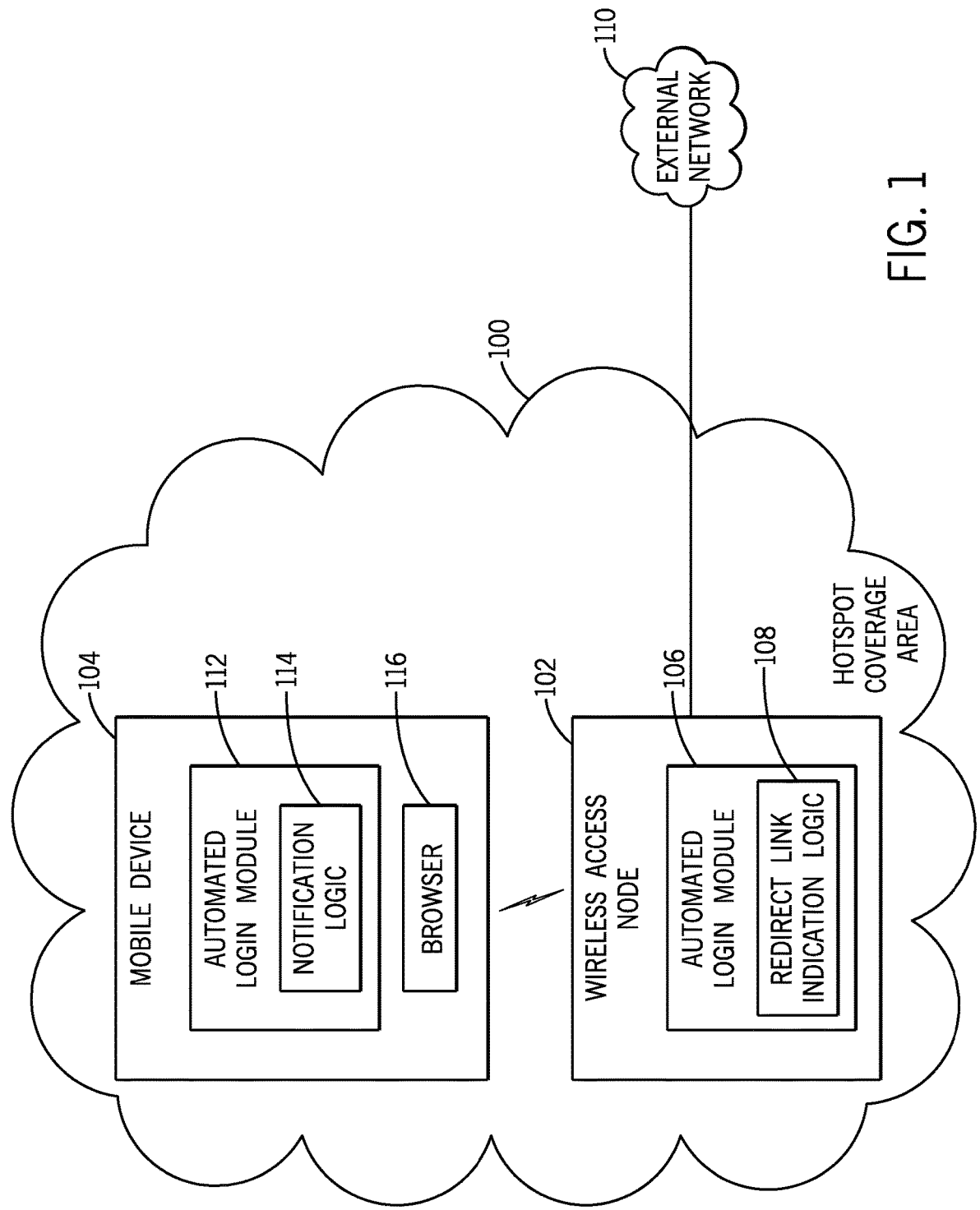
FIG. 1 is a block diagram of an example network arrangement according to some implementations.

Establishing network connectivity with a captive portal involves a manual process in which a user is prompted to make an input before a mobile device is allowed to connect to a hotspot. In the ensuing discussion, a "hotspot" can refer to a physical location that includes a wireless access node (or multiple wireless access nodes). A wireless access node is accessible by a mobile device to connect to another network, such as the Internet or other type of network. A "wireless access node" can refer to a communication device (or an arrangement of communication devices) that is able to wirelessly communicate with a mobile device to allow for the mobile device to establish a connection for communication with another network.

Examples of a wireless access node can include any of the following: an access point (AP) of a wireless local area network (WLAN), a router, a gateway, and so forth. In some examples, a hotspot can use Wi-Fi technology. In other examples, a hotspot can use other types of wireless communication technologies.

A "mobile device" can refer to any type of electronic device that uses wireless communications. As examples, a mobile device can include any of the following: a portable computer, a smartphone, a tablet computer, a game appliance, a personal digital assistant (PDA), a wearable device, a desktop computer, a vehicle (or a device in a vehicle), a health monitor, or any other type of electronic device.

In contrast to manual login procedures provided by captive portals, automated hotspot login procedures can be used, such as those provided by Passpoint Hotspot 2.0 as described in the Wi-Fi Alliance Hotspot 2.0 Release 2, Technical Specification, Version 1.0.0," August 2014. An automated hotspot login procedure allows a mobile device to log into (or more generally, to establish connectivity) with a wireless access node of a hotspot without any indication or manual involvement to the user of the mobile device. This means that the user may not notice the hotspot connection occurring.

Furthermore, depending on the application programming interface (API) made available to applications on the mobile device, user credentials (e.g. user names and passwords or other user credentials) for automated login procedures may be provided by an application (i.e. be unknown to the user) and/or the attempt to connect to the hotspot may be triggered by the application without the conscious involvement of the user.

With an automated login procedure, local content belonging to a hotspot provider may not be displayed to the user during the automated hotspot login procedure, and the user may not even be aware of the possibility of accessing such local content. "Local content" or more generally "content" can refer to any information made available to a mobile device regarding products, services, or other information which may be specific to, or relates to, the geographic location of the hotspot. The local content can be in the form of a web page. In other examples, the local content can include an audio file, a video file, a document, and so forth. As a result, the hotspot provider may lose an advertising opportunity, or may not be able to present other information to the user of the mobile device. In addition, a user may no longer be able to view and accept any terms and conditions associated with the hotspot use. In some hotspots and regulatory domains where users have to accept terms and conditions, there may no longer an opportunity to display such terms and conditions.}

Also, with automated hotspot login procedures, since the authentication mechanism does not involve user interaction, a user may not have to start a web browser prior to accessing an external network such as the Internet or other type of network. If a web browser is not started in the mobile device, then no mechanism is available to present the local content to the user.

FIG. 1 is a block diagram of an example network arrangement that includes a coverage area 100 of a hotspot. The hotspot includes a wireless access node 102, to which a mobile device 104 is able to wirelessly connect. Although just one wireless access node 102 is depicted as being part of the hotspot, it is noted that in other examples, multiple wireless access nodes can be included in a hotspot.

Although just one mobile device 104 is depicted as being in the coverage area 100 of the hotspot, it is noted that there can be multiple mobile devices 104 in the hotspot coverage area 100.

The wireless access node 102 includes an automated login module 106 (hereinafter referred to as a "node automated login module") that controls automated login by the mobile device 104 of the hotspot. The wireless access node 102 can also include a redirect link indication logic 108 according to some implementations of the present disclosure, which is able to send a redirect link indication referring to local content for presenting at the mobile device 104 during an automated login process by the mobile device 104 to the wireless access node 102. In FIG. 1, the redirect link indication logic 108 is depicted as being part of the node automated login module 106; in other examples, the redirect link indication logic 108 can be separate from the node automated login module 106.

The node automated login module 106 (or a portion thereof) can be implemented as machine-executable instructions that can be executed by the wireless access node 102. In other examples, the node automated login module 106 (or a portion thereof) can be implemented using hardware circuitry.

The mobile device 104 includes an automated login module 112 (hereinafter referred to as "device automated login module") that can interact with the node automated login module 106 to perform an automated login procedure. In some examples, the device automated login module 112 includes a notification logic 114 to provide a notification to the user of the mobile device 104 regarding availability of local content referred to by a redirect link indication provided by the redirect link indication logic 108 of the wireless access node 102. In some examples, the notification logic 114 can be part of the device automated login module 112. In other examples, the notification logic 114 can be separate from the device automated login module 112.

The mobile device 104 also includes a web browser 116 that can display a browser display screen for presenting content of a web page. In other examples, instead of the web browser 116, the mobile device 104 can include another type of application to display content provided by a data source.

Once the mobile device 104 is connected to (or more generally associated with) the wireless access node 102 in response to completion of an automated login procedure, the mobile device 104 communicates with devices coupled to an external network 110 (e.g. Internet or other type of network) through the wireless access node 102 (and any other intermediate node that may be part of the hotspot). A mobile device 104 is associated with the wireless access node 102 (or more generally, to the hotspot) if the mobile device 104 has presented user credentials and other information that allow the wireless access node 102 (or another control node of the hotspot) to authenticate and authorize the mobile device 104 in the hotspot.

Automated Login with Notification of Local Content

Figure 2:
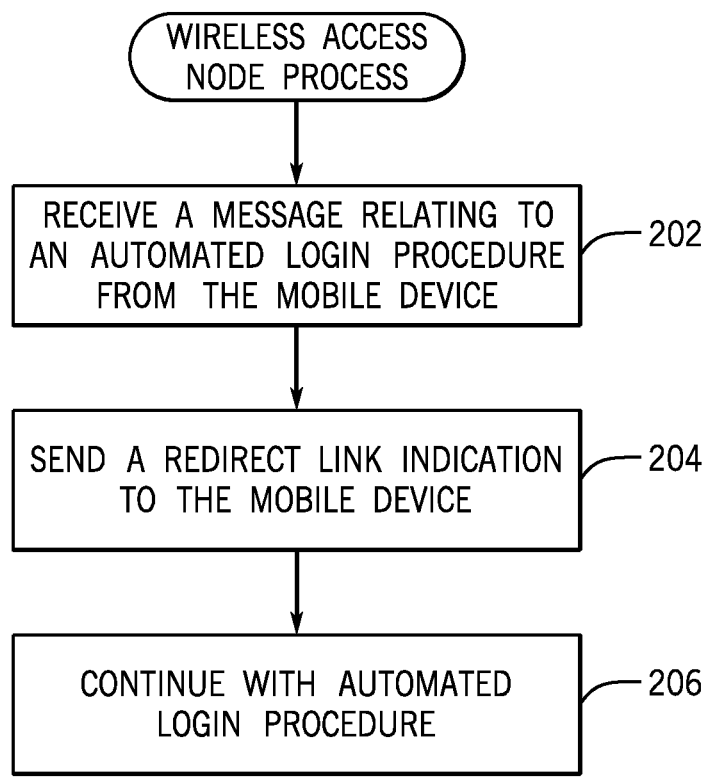
FIG. 2 is a flow diagram of an example process performed by a wireless access node of a hotspot, according to some implementations.

FIG. 2 is a flow diagram of a process according to some implementations, which can be performed by the wireless access node 102. The node automated login module 106 of the wireless access node 102 can receive (at 202) a message relating to an automated login procedure from the mobile device 104.

In response to the message, the redirect link indication logic 108 sends (at 204) a redirect link indication to the mobile device 104, where the redirect link indication refers to local content for presenting at the mobile device 104. In some examples, the redirect link indication can include a Local Content Uniform Resource Locator (URL), which refers to a location that contains the local content. The location referred to by the Local Content URL can be at a server computer, such as a web server computer or other type of server computer. The server computer storing the local content or having access to the local content can be provided by a hotspot service provider, in some examples.

The node automated login module 106 then continues (at 206) with the automated login procedure to associate the mobile device 104 with the hotspot. An automated login procedure, such as according to Passpoint Hotspot 2.0, allows the mobile device 104 to be automatically associated with the wireless access node 102, so that the mobile device 104 can communicate over the external network 110.

In some examples, the message received at 202 can be in the form of an Access Network Query Protocol (ANQP)-element. ANQP (which is an advertisement protocol) operates as a simple query and response protocol that is used by a mobile device for discovering a range of information from an access network information (ANI) server. The ANI server can be co-located with the wireless access node 102, or can be separate from the wireless access node 102. ANQP allows the mobile device to determine the properties of a network before starting an association procedure.

Information obtained through ANQP can include any or some combination of the following: a network identifier, a roaming relationship, a supported security method, emergency services capability, available service providers, and so forth. ANQP defines various different ANQP-elements. One type of an ANQP-element is a Network Authentication Type ANQP-element. The Network Authentication Type ANQP-element provides a list of authentication types together with a redirect URL.

In accordance with some implementations of the present disclosure, in response to the Network Authentication Type ANQP-element received (at 202) from the mobile device 104, the wireless access node 102 can send an ANQP-element response that includes the redirect link indication sent (at 204). As noted above, the redirect link indication can include a Local Content URL that refers to a location that contains local content.

Figure 3:
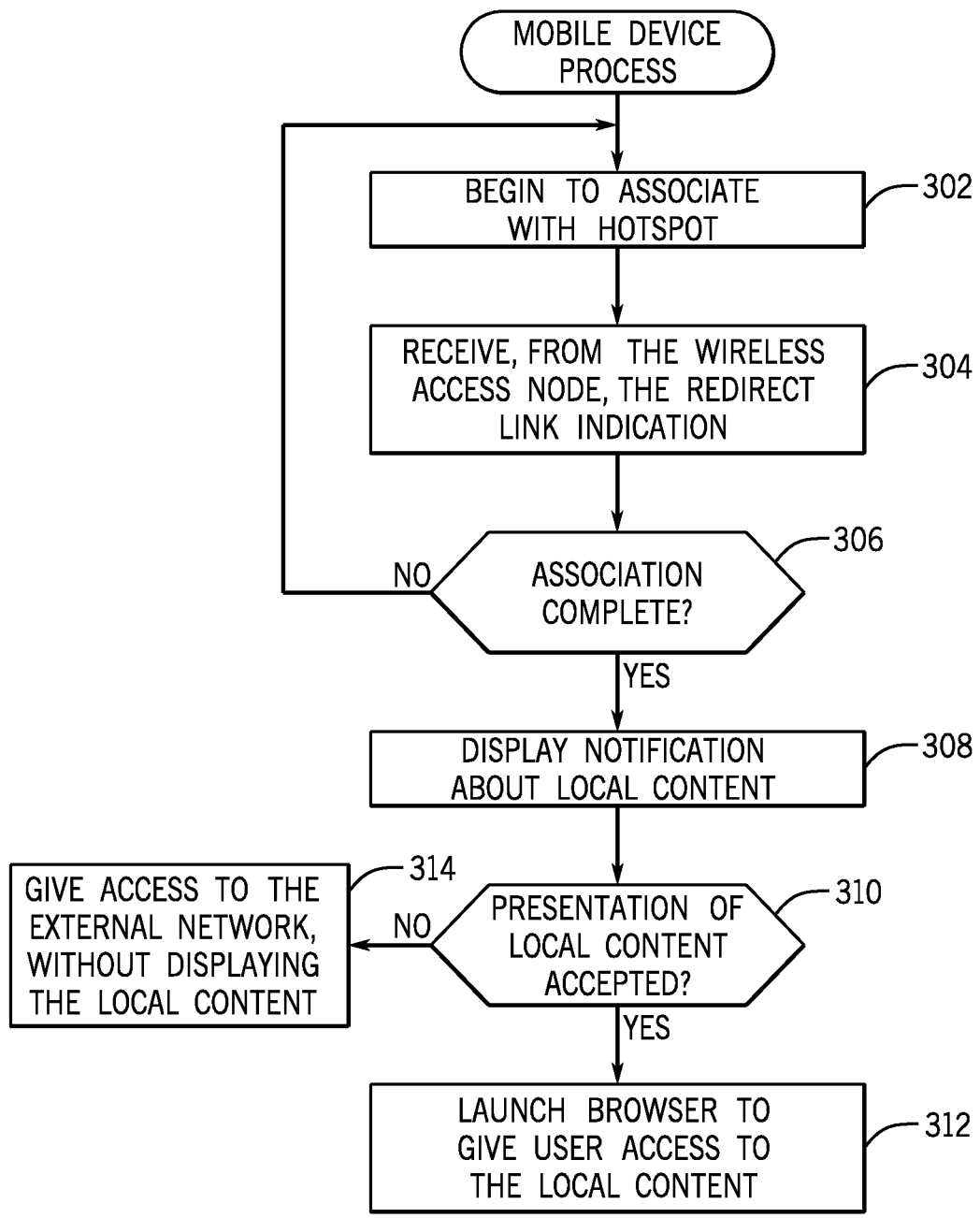
FIG. 3 is a flow diagram of an example process performed by a mobile device, according to some implementations.

FIG. 3 is a flow diagram of a process performed at the mobile device 104 according to some implementations. In response to user activation, or in response to detection of a hotspot, the device automated login module 112 in the mobile device 104 begins (at 302) to associate with the hotspot, and more specifically, to begin the association with the wireless access node 102. This process begins the automated login procedure according to some implementations. As part of the associating, the device automated login module 112 can send a Network Authentication Type ANQP-element, in some examples as discussed above.

The device automated login module 112 receives (at 304), from the wireless access node 102, the redirect link indication (sent at 104) that refers to content for presenting at the mobile device 104. For example, the redirect link indication can be a Local Content URL received in an ANQP response to the Network Authentication Type ANQP-element.

Next, the device automated login module 112 determines (at 306) whether the association with the hotspot is completed. If the association is not completed, then the device automated login module 112 returns to task 302 to re-attempt the automated login procedure. On the other hand, in response to determining (at 306) that the association between the mobile device 104 and the hotspot is completed, the notification logic 114 at the mobile device 104 displays (at 308) a notification to the user of the mobile device 104 about the local content referred to by the received redirect link indication. For example, the notification can be of availability of the local content, and can include a prompt of whether or not the user wishes to view the local content. More specifically, in some examples, the presented notification (which can be displayed at the mobile device 104, such as in a pop-up display screen or in a notification area of a display) can prompt the user to accept or reject presentation of the local content referred to by the received redirect link indication. Note that the notification can be presented to the user without launching the web browser 116 at the mobile device 104.

In some examples, different notifications can be provided to the mobile device 104 depending upon whether or not the mobile device 104 is authenticated with respect to the hotspot.

In some implementations, a notification framework within the mobile device 104 can be used to advertise information collected from a request/response exchange (e.g. according ANQP) between the mobile device 104 and the wireless access node 102. This allows a new notification regarding the existence of local content to be presented to the device user during hotspot login. A simple example of such a notification can be a "do you wish to access local content" control element on the mobile device's user interface (UI).

The notification logic 114 then determines (at 310) whether the presentation of the local content has been accepted. If so, a web browser 116 at the mobile device 104 is launched (at 312) to give user access to the local content, by retrieving content based on the redirect link indication, such as retrieving content located at a Local Content URL. The browser 116 can display the retrieved local content, which can be in the form of a web page, for example. In some implementations, the local content is presented or made available on the mobile device without completing authentication by the mobile device as part of the hotspot login procedure.

However, in response to the notification logic 114 determining that the presentation of the local content has been rejected, the mobile device 104 is given access (at 314) to the external network 110 through the wireless access node 102, and the mobile device 104 does not present the local content referred to by the redirect link indication.

It is noted that the acceptance or rejection of the presentation of the local content (as determined at 310) can be an acceptance or rejection by a user (e.g. the user clicks on an "Accept" button or "Reject" button in a display screen), or an acceptance or rejection by machine-executable instructions.

Although reference is made to transmitting a redirect link indication referring to local content as part of an automated login procedure to a hotspot, it is noted that in further implementations, a redirect link indication referring to local content can be sent by the wireless access node 102 to the mobile device 102 before the hotspot login procedure, after the hotspot login procedure, or independent of any hotspot login procedure.

In some implementations, upon receipt of the redirect link indication referring to the local content, the redirect link indication can be stored at the mobile device 104. In some examples, the mobile device 104 can receive multiple Local Content URLs referring to different local content. One of the Local Content URLs can be selected for use depending upon various factors, as discussed further below.

In the ensuing discussion, a station (STA) is a device that is able to use the Institute of Electronics and Electrical Engineers (IEEE) 802.11 protocol for WLAN communications. A STA can be an access point (AP) or a mobile device 104 (referred to as a non-AP STA). The wireless access node 102 is referred to as an AP (access point of a WLAN). As the 802.11 protocol has been designed to be symmetrical between STAs (e.g. between a non-AP STA and an AP), all the following implementations are also applicable for reverse operation (e.g. a non-AP STA transmits information to an AP) and also for peer to peer communications (e.g. where both devices are non-AP STAs).

In some implementations, the AP (an example of the wireless access node 102) can transmit to a non-AP STA (an example of the mobile device 104) one or more Local Content URLs referring to local content. The AP may further indicate, for each Local Content URL or group of Local Content URLs:

- whether the URL (group) is accessible for a non-AP STA that has successfully completed authentication (as part of the association with the AP);
- whether the URL (group) is accessible for a non-AP STA that has not completed authentication;
- whether the URL (group) is accessible for a non-AP STA that has attempted authentication but where the authentication was not successful (e.g. because credentials are not valid);
- whether display of the local content referred to by the URL (group) is mandatory (for a non-AP STA that has a web browser or similar functionality); or
- whether display of the local content referred to by the URL (group) is recommended (for a non-AP STA that has a web browser or similar functionality).

The AP may take into account the authentication state (authenticated or not authenticated) of the non-AP STA in determining which Local Content URL(s) to transmit.

The AP can transmit a Local Content URL to the non-AP STA in response to a request from the non-AP STA, or may transmit a Local Content URL autonomously. The AP can transmit a Local Content URL only after the completion of a login procedure; as noted above, the Local Content URL transmitted may depend on the outcome of the authentication that is part of the login procedure.

As noted above, Local Content URL(s) can be transmitted by the AP within an ANQP response message (in response to an ANQP-element transmitted by the non-AP STA). In a more specific example, Local Content URL(s) can be transmitted within an ANQP response of type "Network Authentication Type."

In some implementations, the AP can transmit Local Content URL(s) that can be transmitted by the AP within an ANQP response message (in response to an ANQP-element transmitted by the non-AP STA). In a more specific example, Local Content URL(s) can be transmitted within an ANQP response of type "Network Authentication Type."

The non-AP STA can transmit a request to the AP for Local Content URLs in response to one or more of the following:

an authentication attempt using an automated login procedure (such as according to Passpoint Hotspot 2.0) which does not involve user interaction;

a user- or application-initiated request, e.g. in response to an indication that the non-AP STA is within coverage of a hotspot; or a user or application request to connect to a hotspot, which may further indicate that the user or application does not wish to attempt to authenticate with the hotspot but only to obtain local content that is accessible without authentication.

In response to receiving a Local Content URL, the non-AP STA can perform one or more of the following:

autonomously initiate a request for the local content referred to by the Local Content URL;

indicate on a display screen that the Local Content URL has been received, using the notification logic 114 of FIG. 1, for example;

prompt (such as with a notification alert) the user whether or not the user wishes to access the Local Content URL;

initiate a request for the local content referred to by the Local Content URL, in response to a user or application request (which in turn may be in response to an indication or prompt as described above);

open an application (e.g. a web browser) capable of displaying the local content referred to by the Local Content URL and pass the application either the Local Content URL or the local content; or take no action.

The behavior of the non-AP STA may depend on one or more of:

the authentication state of the STA (specifically, for example, the non-AP STA may only open a Local Content URL if the non-AP STA has successfully completed authentication and (if indicated) the Local Content URL is accessible to authenticated non-AP STAs;

previously-configured preference, which may be applicable to a specific hotspot, set of credentials, and/or authentication technique (specifically, for example, the user may have previously configured the non-AP STA to always (or never) display Local Content URLs received from a specific hotspot (as identified by e.g. the hotspot's SSID); or an indication as to whether the display of the Local Content URL is mandatory or recommended.

In some implementations where the AP can determine whether the non-AP STA is authenticated or not in the automated login procedure, the AP is able to change the information at the URL returned in the earlier Local Content URL message. This allows the AP to change the behaviour of the non-AP STA regarding the type of local content that can be viewed, depending on whether the non-AP STA's login was successful or not.

In some implementations, the notification of the availability of the local content referred to by the Local Content URL is independent of launching a web browser on the non-AP STA. In such implementations, a web browser does not have to be launched during the login procedure to the hotspot, unless the user wishes to view local content, once prompted by a notification.

Figure 4:
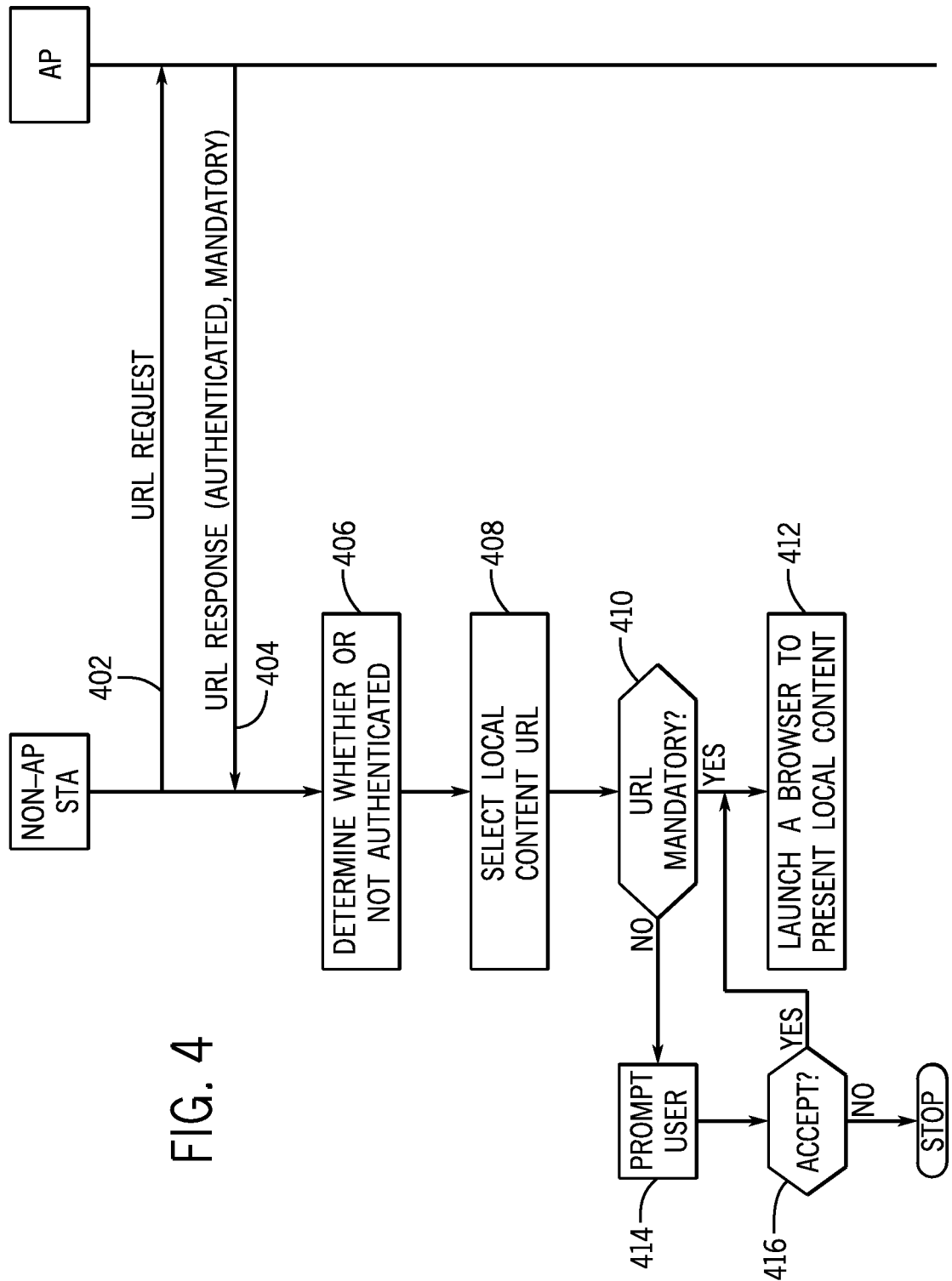
FIG. 4 is a message flow diagram involving an example access point (AP) and an example non-AP station (STA), according to some implementations.

FIG. 4 is a message flow diagram of a process according to some implementations that involves a non-AP STA and an AP. The non-AP STA sends (at 402), to the AP, a URL Request for a Local Content URL. In response, the AP sends (at 404) a URL Response to the non-AP STA. The URL Response can include at least one Local Content URL. In some implementations, the URL Response can further include an Authenticated field (or information element) and a Mandatory field (or information element). The Authenticated field can indicate whether or not the non-AP STA has been authenticated in the hotspot login procedure (a first value of the Authenticated field indicates that the non-AP STA has been authenticated by the AP, and a second, different value of the Authenticated field indicates that the non-AP STA has not been authenticated).

The non-AP STA determines (at 406) whether or not the non-AP STA has been authenticated, such as based on the Authenticated field. The non-AP STA can select (at 408) a Local Content URL to use in response to determining that the non-AP STA has been authenticated. In other examples, the non-AP STA can select different Local Content URLs depending upon whether or not the non-AP STA has been authenticated; for example, if the non-AP STA has been authenticated, the non-AP STA can select a first Local Content URL, and if the non-AP STA has not been authenticated, the non-AP STA can select a second, different Local Content URL.

The non-AP STA determines (at 410) whether or not presentation of the Local Content URL is mandatory. If so, the non-AP STA launches (at 412) a web browser at the non-AP STA to present the local content. If the presentation of the Local Content URL is not mandatory, then the non-AP STA prompts (at 414) the user to accept or reject the display of the local content. If the user accepts (as determined at 416), then the non-AP STA launches (at 412) the web browser to display the local content. However, if the user rejects (as determined at 416), then the non-AP STA makes a determination to not display the local content referred to by the Local Content URL.

In alternative examples, the process of FIG. 4 is modified such that the Local Content URL is sent by the AP to the non-AP STA in response to the AP authenticating the non-AP STA in the hotspot login procedure—in other words, the Local Content URL is not sent if the non-AP STA is not authenticated. If the non-AP STA is authenticated, then the Local Content URL can be sent with a field indicating whether or not presentation of the local content referred to by the Local Content URL is mandatory. Then, tasks 410, 412, 414, and 416 can be performed.

Automated Captive Portal Login with Notification of Local Content

In alternative implementations, techniques or mechanisms as discussed above can also be used with a captive portal procedure modified to allow for automated login (e.g. automatically complete login details in the captive portal web page without user input). In such implementations, the device automated login module 112 (FIG. 1) can interpret the captive portal redirection (to a web page in the walled garden of the captive portal) as an indication that the login procedure is to be completed automatically. As part of the automated login procedure using the captive portal, a redirect link indication referring to local content can be sent by the wireless access node 102 to the mobile device 104, similar to that discussed above.

Automated Login Failure Handling

Figure 5:
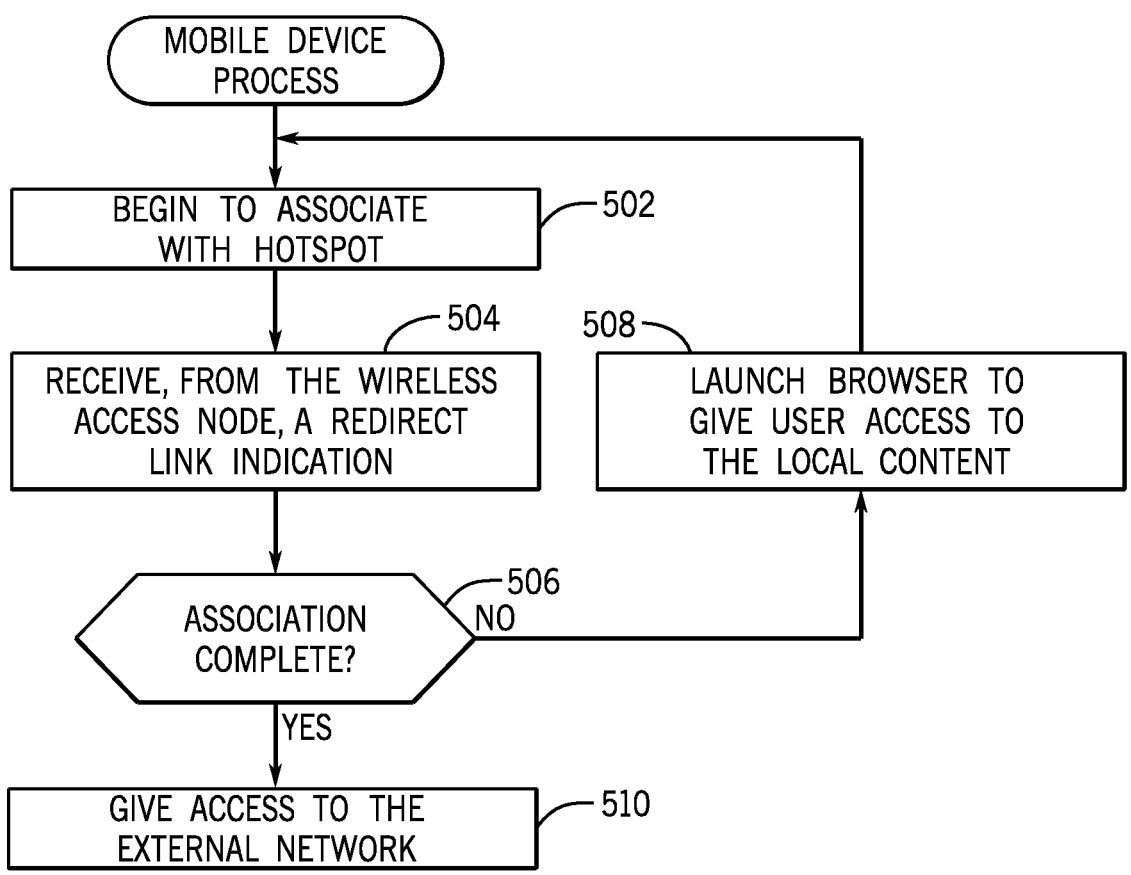
FIG. 5 is a flow diagram of an example process performed by a mobile device, according to further implementations.

In further implementations, if a login procedure (automated login procedure or manual login procedure) fails, then a new Local Content URL can be sent by the wireless access node 102 to re-direct the user to another form of manual login, such as according to a captive portal technique. This process is depicted in FIG. 5, which can be performed by the mobile device 104. The mobile device 104 begins (at 502) to associate with a hotspot, to initiate a login procedure. As part of the login procedure, the mobile device receives (at 504), from the wireless access node 104, a redirect link indication referring to local content.

The mobile device 104 determines (at 506) whether the association of the mobile device 104 with the hotspot is complete. If not (the association has failed), then the mobile device 104 can launch (at 508) a web browser to display the local content referred to by the redirect link indication received (at 504). The local content can be part of a backup login technique (to allow the user to perform association with the hotspot using a different technique) and/or can include information to assist the user in diagnosing issues with the login procedure.

Use with Hotspot 2.0 Online Sign Up (OSU)

Online sign up (OSU) is the process by which a mobile device registers with a service provider (SP), enabling a user to select a plan for obtaining network access, and the user is then provisioned with credentials to securely connect to an access network. An example of an OSU process is described in the document "Wi-Fi Alliance Hotspot 2.0 Release 2, Technical Specification, Version 1.0.0," August 2014.

Figure 6:
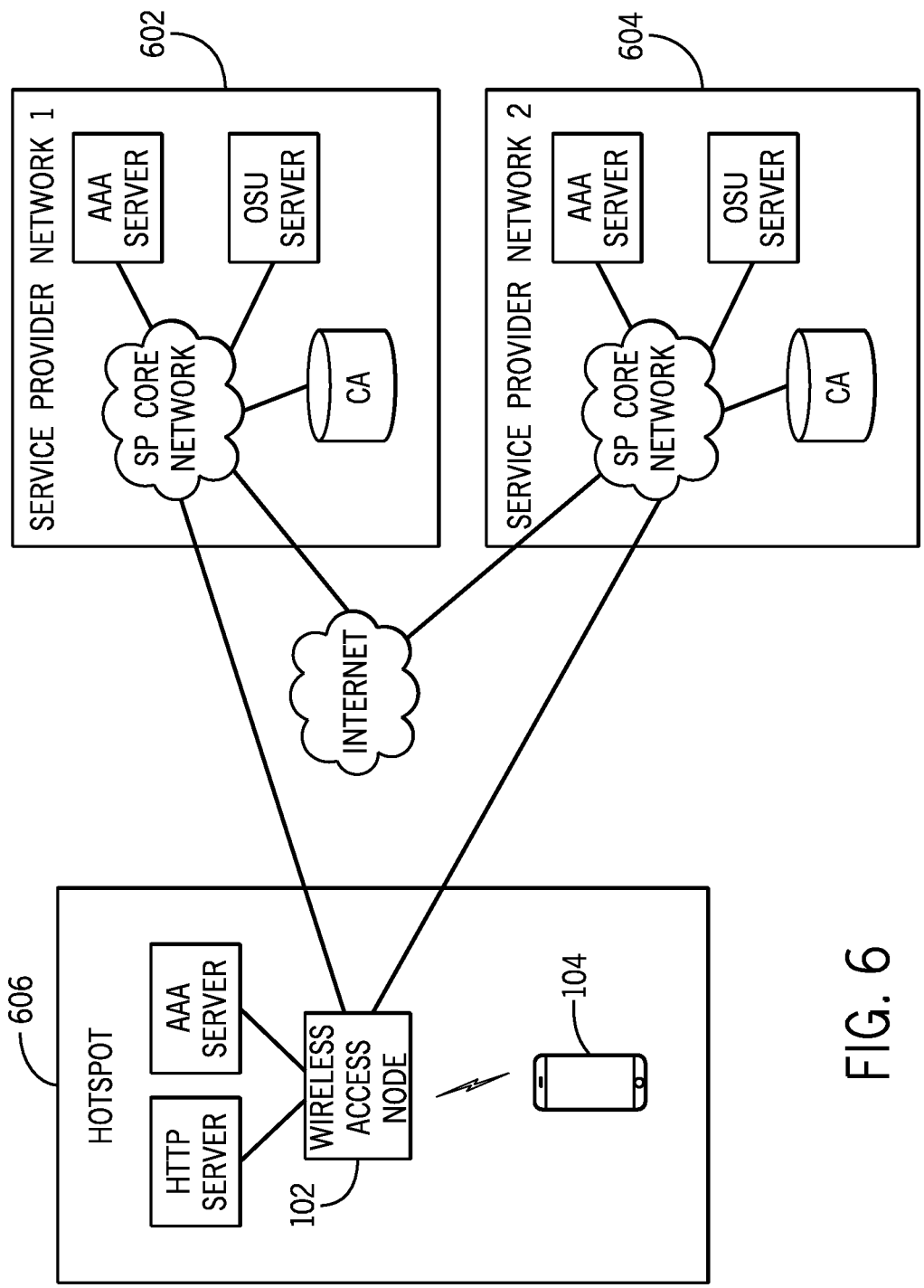
FIG. 6 is a block diagram of an example arrangement to perform online sign up (OSU), according to further implementations.

FIG. 6 shows an example network architecture for OSU. FIG. 6 depicts two service provider (SP) networks 602 and 604, from which a user can select when signing up to obtain network access. Each SP network has an OSU server, an authentication, authorization and accounting (AAA) server (for authenticating a user, authorizing the authenticated user to selected services, and providing accounting based on use of the selected services), and (access to) a certificate authority (CA) (that issues digital certificates containing credentials). The OSU server registers new subscribers and provisions each subscriber's mobile device with a security credential.

These OSU server, AAA server, and CA may be co-located or may be provided separately. Each SP network also includes an SP core network to communicate with the OSU server, AAA server, and CA.

FIG. 6 also depicts a hotspot 606 that has an AAA server and a Hypertext Transfer Protocol (HTTP) server configured to allow only HTTPS (HTTP Secure) traffic to the OSU servers of the SP networks 602 and 604.

Although not shown in FIG. 6, the hotspot 606 can include two logical APs (which may be physically co-located). There is one AP provided for online sign up (OSU AP) and one AP provided for the usual user data connection (Production AP). In this way, OSU traffic is not mixed with user traffic.

Figure 7:
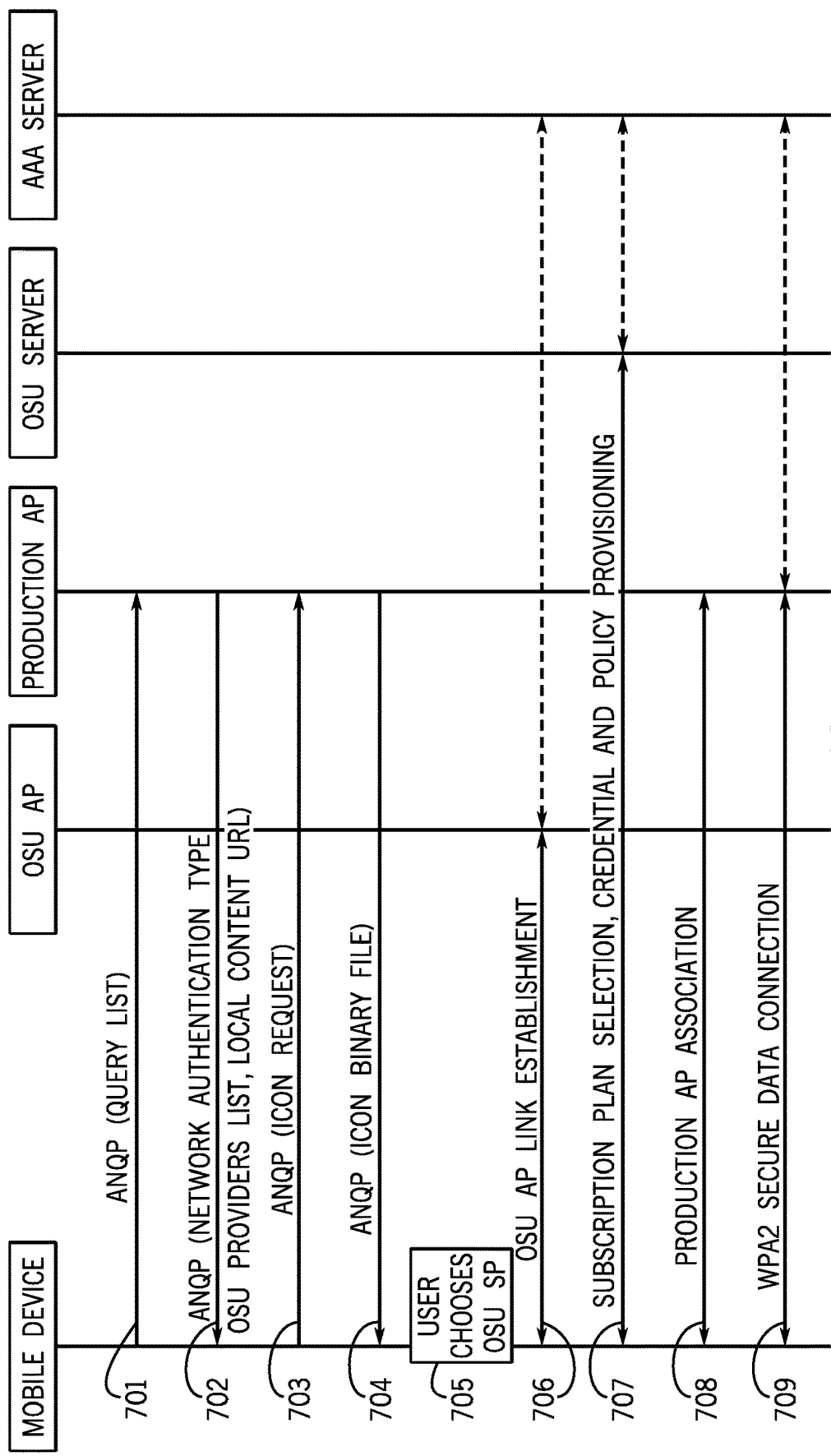
FIG. 7 is a message flow diagram of an example OSU process, according to further implementations.

An overview of a message exchange sequence for a mobile device to perform OSU, including connection to an OSU server, is shown in FIG. 7. Tasks 701-705 relate to OSU SP discovery and selection. Tasks 706 and 707 relate to the OSU process. Tasks 708 and 709 relate to the mobile device connecting to the hotspot 606 using the Production AP, using the new credentials from the completed OSU process. The following describe further details of tasks 701-709.

Task 701: The mobile device issues an ANQP Query frame to a Production AP in the hotspot 606, for the network authentication type and OSU provider information.

Task 702: The Production AP returns a Network Authentication Type element and an OSU Providers List element to the mobile device. If the Network Authentication Type message indicates that OSU is available, then the OSU Providers List element contains the OSU service set identifier (SSID) and at least one OSU provider.

Figure 8:
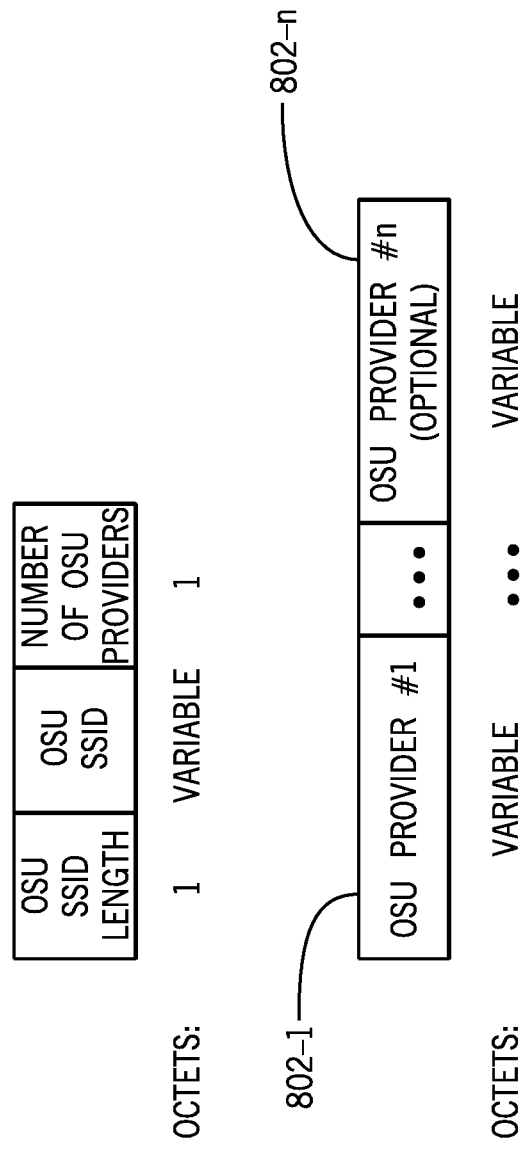
FIG. 8 shows an example format of an OSU Providers List element, according to some implementations.

The OSU Providers List element is an ANQP-element defined by Hotspot 2.0. The OSU Providers List element provides information about one or more entities that offer OSU service. FIG. 8 shows the format of an OSU Providers List element. For each OSU provider, the OSU Providers List element includes a respective OSU Provider subfield that includes the following information: a friendly name (in one or more human languages), a Uniform Resource Identifier (URI) of the OSU server, and other information.

At least one OSU Provider subfield (OSU Provider subfields 802-1 to 802-n depicted in FIG. 8) is available if OSU is supported. Support for OSU is indicated by the Network Authentication Type Indicator holding the value of "On-line enrollment supported" in the Network Authentication Type ANQP-element. Other subfields in the OSU Provider subfield depicted in FIG. 8 are described by Wi-Fi Alliance Hotspot 2.0 Release 2.

Figure 9:
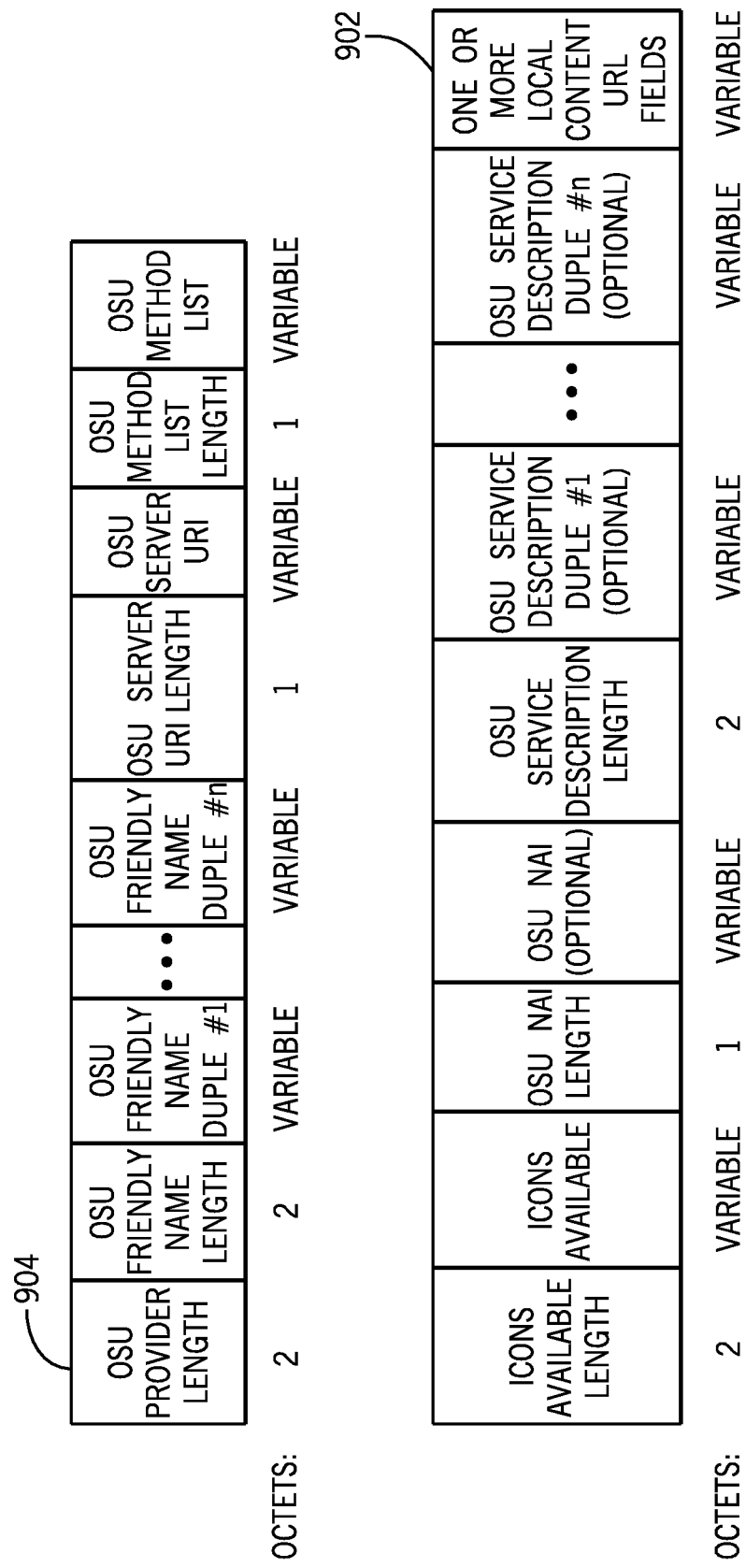
FIG. 9 shows an example format of an OSU Provider subfield in the OSU Providers List element, according to some implementations.

In some implementations of the present disclosure, as shown in FIG. 9, an OSU Provider subfield (as described by Wi-Fi Alliance Hotspot 2.0 Release 2) can be modified to include at least one extra field 902 that contains a Local Content URL referring to local content.

In FIG. 9, an OSU Provider Length subfield 904 can have a value is set to a sum of 9 plus the sum of the lengths of the following subfields: OSU Friendly Name Duple(s), OSU Server URI, OSU Method List, Icons Available, OSU_NAI, OSU Service Description Duple(s) and the "One or more Local Content URL fields" 902. Further information relating to OSU Friendly Name Duple(s), OSU Server URI, OSU Method List, Icons Available, OSU_NAI, OSU Service Description Duple(s) is provided in Wi-Fi Alliance Hotspot 2.0 Release 2.

Figure 10:
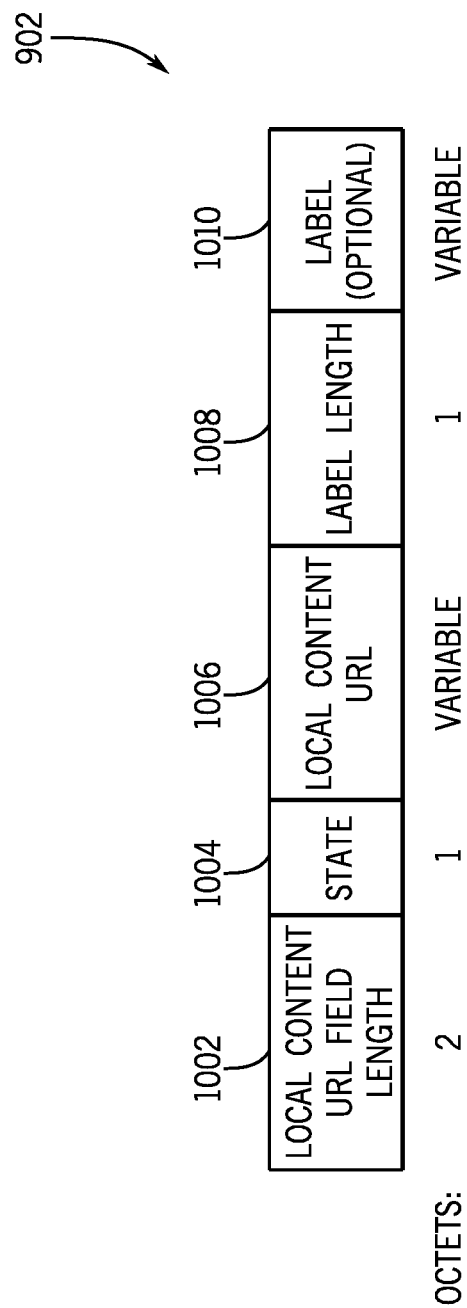
FIG. 10 shows an example format of a Local Content URL field in the OSU Provider subfield, according to some implementations.

In some examples, a Local Content URL field 902 includes subfields as depicted in FIG. 10. The subfields include a Local Content URL Field Length subfield 1002, a State subfield 1004, a Local Content URL subfield 1006, a Label Length subfield 1008, and an optional Label subfield 1010.

The State subfield 1004 can indicate a state of the mobile device, with different values of the State subfield 1004 indicating different states as indicated below:

| State | Description |
| --- | --- |
| 0 | Not authenticated |
| 1 | Authenticated |
| 2 | Failure during authentication |
| 3 | Incorrect credentials |
| 4 | Credentials expired |
| 5 | Delivered by AAA Server |

Alternatively, the state can be a bit field containing the logical 'OR' of states for which the link is appropriate, e.g.:
bit 0=1: appropriate for non-authenticated STA;
bit 1=1: appropriate for authenticated STA;
bit 2=1: appropriate for STA where authentication failed due to expired credentials.

State 5 is used when the AP cannot transmit information within the Local Content URL field (e.g. due to security reasons). It indicates that the Local Content URL itself will be transmitted by an AAA Server associated with the hotspot 606, as part of the mobile device's authentication procedure. The Local Content URL field is blank and of zero length in this situation.

The Local Content URL Field Length subfield 1002 specifies the length in octets of the Local Content URL field 1006 (optionally, excluding the length and/or state fields). The Local Content URL subfield 1006 is a variable length field of a URL that is used for directing the mobile device to local content.

Depending on the state of the connection between the mobile device and the hotspot, each Local Content URL can be a different value, to direct the mobile device to different local content based on different states.

The Label Length subfield 1008 can contain the value of the length of the Label subfield 1010 in octets. If the Label subfield 1010 is not used, the Label Length subfield 1008 is also not used. In another example, the Label Length subfield 1008 may indicate explicitly (e.g. by indicating a length of zero) that the Label subfield 1010 is not present.

The Label subfield 1010 is a variable length field containing a description of the URL. This could be a free form string or a standardized value. The Label subfield 1010 can assist the mobile device in knowing the type and potential usage of the URL.

In other examples, the various information discussed above can be included in other message elements, such as in probe requests, probe responses, public action frames, Generic Advertisement Service (GAS) frames, frames used by Wi-Fi Direct, Miracast and Neighbor Aware Network (NAN), and so forth. In addition the Local Content URL can be delivered within other technologies such as Ethernet, Bluetooth, and cellular wireless access technology.

The following refers again to FIG. 7 and the remaining tasks of FIG. 7. Further details of tasks 703-709 can be found in Wi-Fi Alliance Hotspot 2.0 Release 2.

Task 703: The mobile device may request an OSU provider icon of the desired size in pixels using the Icon Request Hotspot 2.0 ANQP-element. In this example, an exchange of an icon is requested by the mobile device. A request of the icon is optional.

Task 704: If an icon was requested, the Production AP returns the icon binary file for the requested icon. If the OSU Providers List element contains the names of more than one OSU provider, tasks 703 and 704 may be repeated for each provider.

Task 705: The mobile device displays on its user interface a list of available OSU provider icon(s) and/or friendly name(s). If the user selects an icon and/or friendly name, indicating that online sign up for a subscription is desired, the mobile device continues with task 706.

Task 706: The mobile device connects to an AP in the user-selected OSU ESS.

Task 707: The user provides the information used by the SP to sign up for a subscription. Credentials (certificate or username/password) and optionally network-selection policy are provisioned on the mobile device. When credentials are provisioned, the OSU server of the SP service network sends an update request to the AAA server with the mobile device's provisioned credentials.

Task 708: Using the newly provisioned credentials, the mobile device disassociates from the OSU AP in the ESS and associates to the Production AP in the ESS (or a neighboring Production AP in the same ESS)

Task 709: The mobile device and Production AP establish a Wi-Fi Protected Access (WPA2)-Enterprise security association and the user is granted access privileges according to the user's subscription.

Using the OSU technique as discussed above, in response to a request by a mobile device from the hotspot for a list of OSU providers using an ANQP-element as mentioned above, a Local Content URL can be transmitted from the wireless access node 102 of the hotspot to the mobile device, as an extension to the OSU Providers List element. Alternatively, the Local Content URL can be delivered as part of a separate ANQP-element (as discussed below).

The received Local Content URL can be stored in the mobile device, and once the OSU procedure completes, a notification framework within the mobile device indicates using a notification to the user that local content from a content provider is available to display.

If the user wishes to accept the notification, the Local Content URL is used within the mobile device (e.g. to launch a browser) to then display the local content of the content provider.

If the user wishes to not accept the notification, the mobile device can continue with other applications potentially using network access through the hotspot.

The notification on the mobile device may take several forms, e.g. a "do you wish to access local content" button in the user interface. In other examples, a user indication to accept viewing of the local content can be performed using a swipe gesture on the user interface, by providing a sound command, by activating an icon, and so forth.

In some examples, information derived from the Label subfield 1010 of FIG. 10 may be displayed in the notification.

In some examples, the local content can also include more information about payment schemes (e.g. advice of charge), and further information about terms and conditions of the hotspot's use. In some cases, the notification may allow the user to view the terms and conditions directly.

Use of Existing ANQP-Element for Local Content URL

In some examples as discussed above, the Local Content URL can be provided by using an IEEE 802.11-2012 defined Network Authentication Type ANQP-element.

However, when the Network Authentication Type ANQP-element request is received by the wireless access node 102 of the hotspot, the corresponding Network Authentication Type ANQP-response can be configured as follows in some examples:

The Network Authentication Type ANQP-response contains only one Network Authentication Type Unit.

The Network Authentication Type Indicator is set to 0 (indicating "Acceptance of terms and conditions") or 2 (indicating "HTTP/HTTPS redirection").

The Redirect URL field is used as a Local Content URL and is set to the HTTP address of the gateway portal to the resource.

Use of New ANQP-Element for Local Content URL List

In further implementations, a new ANQP-element (an ANQP-element not defined by a current standards) can be created for a more detailed response. As examples, a list of URLs that can be used depending on the state (e.g. authenticated or not) of the device can be returned to a hotspot gateway connection.

Figure 11:
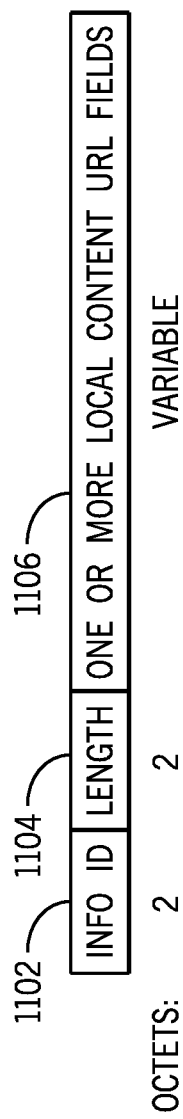
FIG. 11 shows an example format of a Local Content URL List Access Network Query Protocol (ANQP)-element, according to further implementations.

An example implementation is depicted in FIG. 11, which shows a Local Content URL List ANQP-element. The Local Content URL List ANQP-element of FIG. 11 includes an Info ID field that identifies the new ANQP-element, a Length field 1104 that indicates a length of the one or more Local Content URL fields 1106. Each Local Content URL field 1106 contains a respective Local Content URL.

Use of New ANQP-Element for Payment Scheme Information

In further implementations, a new ANQP-element (an ANQP-element not defined by a current standards) can be created for a detailed response about payment scheme information. As examples, a list of payment schemes (e.g. Advice of Charge) that can be used depending on the state (e.g. authenticated or not) of the device can be returned to a hotspot gateway connection.

Wireless Node Architecture

Figure 12:
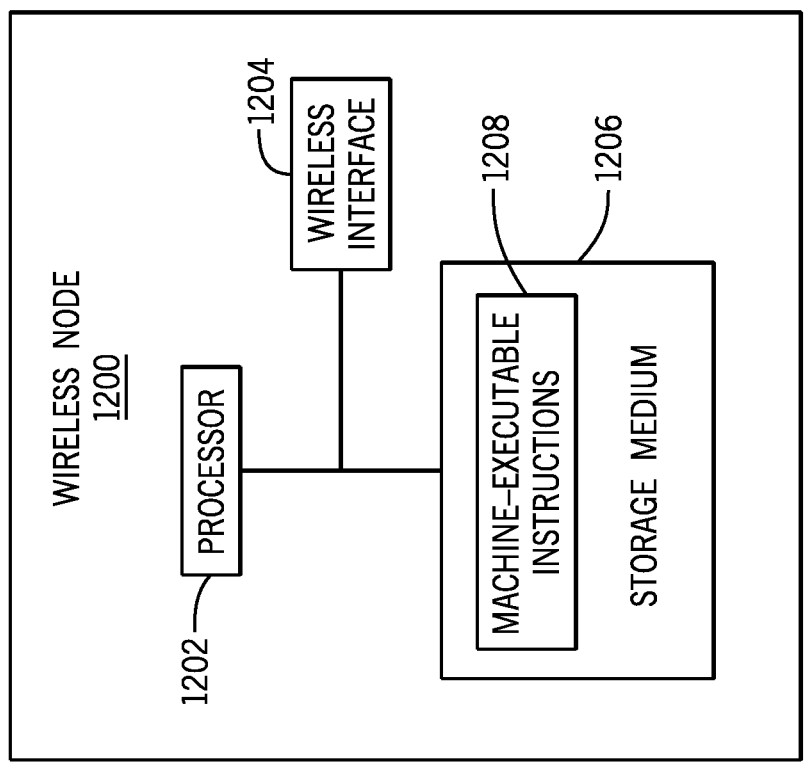
FIG. 12 is a block diagram of an example wireless node, according to some implementations.

FIG. 12 is a block diagram of a wireless node 1200, according to some implementations. The wireless node 1200 can be the mobile device 104 or the wireless access node 102, in some implementations.

The wireless node 1200 includes a processor (or multiple processors) 1202, which can be coupled to a wireless interface 1204 to communicate wirelessly with a peer network. A processor can include a microprocessor, a microcontroller, a physical processor module or subsystem, a programmable integrated circuit, a programmable gate array, or another physical control or computing device.

Also, the processor(s) 1202 can be coupled to a non-transitory machine-readable or computer-readable storage medium (or storage media) 1206, which can store machine-executable instructions 1208, including those used to implement the automated login module 112, the notification logic 114, the browser 116, the automated login module 106, or the redirect link indication logic 108 discussed above. More general, the machine-executable instructions 1208 are executable to perform any of the tasks discussed in the present disclosure.

The storage medium (or storage media) 1206 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   during a process to discover local content of a wireless network:
   transmitting, by a mobile device to an access node connected to the wireless network, a Uniform Resource Locator (URL) Access Network Query Protocol (ANQP) request;
   receiving, by the mobile device from the access node, a URL ANQP response containing a list of a plurality of URLs, each URL of the plurality of URLs referring to respective different local content of the wireless network;
   receiving, by the mobile device from the access node, a frame subfield indicating an authentication state of the mobile device;
   selecting, by the mobile device, a selected URL from among the plurality of URLs based on the authentication state of the mobile device, wherein the selecting selects a first URL from the plurality of URLs responsive to the mobile device being authenticated as indicated by the frame subfield received by the mobile device from the access node;
   retrieving a local content from the selected URL; and
   displaying, by the mobile device, the retrieved local content without first prompting a user.

2. The method of claim 1, wherein the retrieved local content comprises a web page.

3. The method of claim 1, further comprising:
   displaying, at the mobile device, a notification indicating availability of the retrieved local content for presentation at the mobile device.

4. The method of claim 3, wherein displaying the notification is performed without a user launching any web browser at the mobile device.

5. The method of claim 1, wherein the access node is part of a hotspot.

6. The method of claim 1, further comprising:
   determining whether association of the mobile device with the access node has failed; and
   in response to determining that the association has failed, displaying another content referred to by a different URL, the another content permitting a login procedure or providing information to assist a user in diagnosing a failed login procedure.

7. A wireless access node comprising:
   a wireless interface to communicate with a mobile device; and
   at least one hardware processor configured to:
   receive, from the mobile device, a Uniform Resource Locator (URL) Access Network Query Protocol (ANQP) request;
   send, to the mobile device, a frame subfield indicating an authentication state of the mobile device; and
   send, to the mobile device, a URL ANQP response containing a list of a plurality of URLs, each URL of the plurality of URLs referring to respective different local content of a wireless network, the list of the plurality of URLs when sent to the mobile device causing selection, by the mobile device, of a selected URL from among the plurality of URLs based on the authentication state of the mobile device indicated by the frame subfield sent to the mobile device by the wireless access node, to display local content retrieved from the selected URL by the mobile device without first prompting a user.

8. A mobile device comprising:
   a wireless interface;
   at least one hardware processor; and
   a non-transitory storage medium storing instructions executable on the at least one hardware processor to:
   during a process to discover local content of a wireless network:
   transmit, to an access node connected to the wireless network, a Uniform Resource Locator (URL) Access Network Query Protocol (ANQP) request;

receive, from the access node, a URL ANQP response containing a list of a plurality of URLs, each URL of the plurality of URLs referring to respective different local content of the wireless network;

receive, from the access node, a frame subfield indicating an authentication state of the mobile device;

select a selected URL from among the plurality of URLs based on the authentication state of the mobile device indicated by the frame subfield received by the mobile device from the access node, wherein the selecting selects a first URL from the plurality of URLs responsive to the mobile device being authenticated;

retrieve a local content from the selected URL; and display the retrieved local content without first prompting a user.

9. The mobile device of claim 8, wherein the frame subfield is included in the URL ANQP response.

10. An article comprising at least one non-transitory machine-readable storage medium storing instructions that upon execution cause a mobile device to:

during a process to discover local content of a wireless network:

transmit, to an access node connected to the wireless network, a Uniform Resource Locator (URL) Access Network Query Protocol (ANQP) request;

receive, from the access node, a URL ANQP response containing a list of a plurality of URLs, each URL of the plurality of URLs referring to respective different local content of the wireless network;

receive, from the access node, a frame subfield indicating an authentication state of the mobile device;

select a selected URL from among the plurality of URLs based on the authentication state of the mobile device indicated by the frame subfield received by the mobile device from the access node, wherein the selecting selects a first URL from the plurality of URLs responsive to the mobile device being authenticated;

retrieve a local content from the selected URL; and display, as a web page on a user interface of the mobile device, the retrieved local content without first prompting a user.

11. The method of claim 1, wherein the URL ANQP response containing the list of the plurality of URLs is communicated during an online sign up procedure.

12. The wireless access node of claim 7, wherein the URL ANQP response containing the list of the plurality of URLs is communicated as part of an online sign up procedure.

13. The method of claim 1, further comprising:

receiving, by the mobile device, a further indication regarding whether displaying the retrieved local content is mandatory, wherein the displaying of the retrieved local content without first prompting the user is responsive to the further indication indicating that displaying the retrieved local content is mandatory.

14. The method of claim 1, wherein the selecting selects a different second URL responsive to the mobile device not being authenticated.

15. The wireless access node of claim 7, wherein the at least one hardware processor is configured to further:

send, to the mobile device, a further indication specifying whether or not displaying of the local content is mandatory, wherein the further indication set to a first value specifies that the displaying of the local content is mandatory, and the further indication set to a second value specifies that the displaying of the local content is not mandatory.

16. The wireless access node of claim 7, wherein the frame subfield set to a first value specifies that the mobile device has been authenticated, and the frame subfield set to a second value specifies that the mobile device is not authenticated.

17. The mobile device of claim 8, wherein the selecting selects a different second URL responsive to the mobile device not being authenticated.

18. The mobile device of claim 17, wherein the frame subfield set to a first value specifies that the mobile device has been authenticated, and the frame subfield set to a second value specifies that the mobile device is not authenticated.

19. The article of claim 10, wherein the instructions upon execution cause the mobile device to further:

receive, from the access node, a further indication specifying whether or not displaying of the retrieved local content is mandatory, wherein the further indication set to a first value specifies that the displaying of the retrieved local content is mandatory, and the further indication set to a second value specifies that the displaying of the retrieved local content is not mandatory, wherein the displaying of the retrieved first local content without first prompting the user is in response to the further indication indicating that displaying the retrieved local content is mandatory.

20. The article of claim 10, wherein the selecting selects a different second URL responsive to the mobile device not being authenticated.

* * * * *

UNITED STATES PATENT AND TRADEMARK OFFICE
CERTIFICATE OF CORRECTION

PATENT NO. : 10,623,502 B2  
APPLICATION NO. : 14/794191  
DATED : April 14, 2020  
INVENTOR(S) : McCann et al.

Page 1 of 1

It is certified that error appears in the above-identified patent and that said Letters Patent is hereby corrected as shown below:

In the Claims

Column 16:
Line 43, "retrieved first local content" should be --retrieved local content--.

Signed and Sealed this
Eleventh Day of August, 2020

Andrei Iancu
*Director of the United States Patent and Trademark Office*